United States Patent [19]
Trickel

[11] Patent Number: 4,712,338
[45] Date of Patent: Dec. 15, 1987

[54] SOLAR-ENERGY-COLLECTING STRUCTURAL UNIT AND SOLAR ROOF

[76] Inventor: Lorn L. Trickel, 8806 NE. Thompson St., Portland, Oreg. 97220

[21] Appl. No.: 879,954

[22] Filed: Jun. 30, 1986

[51] Int. Cl.⁴ .............................. E04D 1/36; F24J 2/04
[52] U.S. Cl. .................................. 52/90; 52/470; 52/471; 126/417; 126/432; 126/442; 126/448
[58] Field of Search ............... 126/426, 432, 442, 448, 126/434, 436, 417, 450; 52/471, 470, 792, 814, 90

[56] References Cited

U.S. PATENT DOCUMENTS

| | | | |
|---|---|---|---|
| 3,239,986 | 3/1966 | Russell | 52/471 |
| 3,399,664 | 9/1968 | Suhay . | |
| 3,501,878 | 3/1970 | Segal | 52/792 |
| 3,995,804 | 12/1976 | Folds et al. | 126/432 |
| 4,010,733 | 3/1977 | Moore . | |
| 4,111,186 | 9/1978 | Ross et al. | 126/426 |
| 4,158,357 | 6/1979 | Allegro . | |
| 4,194,491 | 3/1980 | Randall . | |
| 4,210,129 | 7/1980 | O'Hanlon . | |
| 4,215,677 | 8/1980 | Erickson | 126/450 |
| 4,263,896 | 4/1981 | Zebuhr | 126/450 |
| 4,269,172 | 5/1981 | Parker et al. | 126/450 |
| 4,271,818 | 6/1981 | Hostwell | 126/448 |
| 4,280,484 | 7/1981 | Mancosu . | |
| 4,282,860 | 8/1981 | Koizumi et al. | 126/450 |
| 4,285,335 | 8/1981 | Simmons, Sr. et al. . | |
| 4,308,858 | 1/1982 | Skillman | 126/450 |
| 4,326,366 | 4/1982 | Werner | 52/792 |
| 4,381,764 | 5/1983 | Wojcek | 126/448 |
| 4,416,265 | 11/1983 | Wallace | 126/450 |

FOREIGN PATENT DOCUMENTS

| | | | |
|---|---|---|---|
| 2475096 | 8/1981 | France | 126/442 |
| 31750 | 2/1982 | Japan | 126/426 |

*Primary Examiner*—William F. Pate, III
*Assistant Examiner*—Michael Safavi
*Attorney, Agent, or Firm*—Eugene D. Farley

[57] ABSTRACT

A solar-energy-collector and solar roof. The collector comprises a panel of solar-energy-absorbing material adapted to lie flat on a roof or other supporting surface. The panel has on its undersurface a plurality of projections serving as feet which support the panel. The projections are spaced from each other by an amount predetermined to provide channels dimensioned to receive a flexible conduit adapted to transport a fluid heat exchange medium in heat exchange relation to the panel. The panels may be cut to conform to roof configuration, chimneys, etc. and the conduit arranged accordingly in the channels. The solar roof comprises a plurality of the panels interconnected to each other.

4 Claims, 7 Drawing Figures

SOLAR-ENERGY-COLLECTING STRUCTURAL UNIT AND SOLAR ROOF

BACKGROUND AND GENERAL STATEMENT OF THE INVENTION

This invention relates to solar-energy-collecting structural units and to solar roofs constructed therefrom.

It is the general purpose of the present invention to provide a solar-energy-collecting unit which may be employed in the construction of a solar roof, i e. of a top covering for a building or other structure which not only provides a waterproof covering for the building but also serves the function of transforming solar energy into usable energy.

It is a further object of the present invention to provide a solar-energy-collecting unit which is compatible with conventional roof construction and may be applied thereto without significant modification.

Another object of the present invention is the provision of a solar roof component which is versatile in its application to roofs having diverse design features and characterized by the presence of surface interruptions such as chimneys, valleys, soil pipes and the like.

Another object of the present invention is the provision of a solar-energy-collector which is highly efficient in converting solar energy to heat energy.

Other objects of the present invention are the provision of a solar-energy-collector which:

Replaces roofing.

Can be installed over the substructure of a conventional roof.

Is relatively light in weight, being no heavier than conventional roofing.

Can be installed quickly and easily.

Is versatile in that it can be used to cool the building to which it is applied, as well as to convert solar energy to heat energy.

Is self-sealing during installation so that in the finished roof there are no seams to leak.

Is reasonable in cost with respect to original cost, installation, and maintenance.

The foregoing and other objects of the invention are achieved by the provision of a solar-energy-collecting unit which, broadly considered, comprises a panel of solar-energy-absorbing material, particularly the various natural and synthetic rubbers. The panel is adapted to lie on the supporting surface, which advantageously may comprise a surface comprising a conventional roof structure.

The panel has on its undersurface a plurality of projections serving as feet which support the panel on the supporting surface. The projections are spaced from each other by an amount predetermined to provide channels dimensioned to receive in a variable pattern a flexible conduit such as a length of rubber tubing adapted to transport water or other fluid heat exchange medium in heat exchange relation with the panel.

The panel preferably takes the form of an elongated continuous strip which may be applied from top to bottom of a roof structure, in conjunction with other similar strips which are coupled to each other in spaced apart relation by means of a cap piece fastened to the respective adjacent edges of the strips. Suitable plumbing is connected to the flexible conduit contained in the panels to provide the finished roof assembly.

THE DRAWINGS

DETAILED DESCRIPTION OF A SPECIFIC EMBODIMENT OF THE INVENTION

As indicated above, the solar roof of my invention basically comprises a plurality of solar-energy-collecting units in combination with a roof substructure which may comprise a conventional roof substructure.

Figure 5:
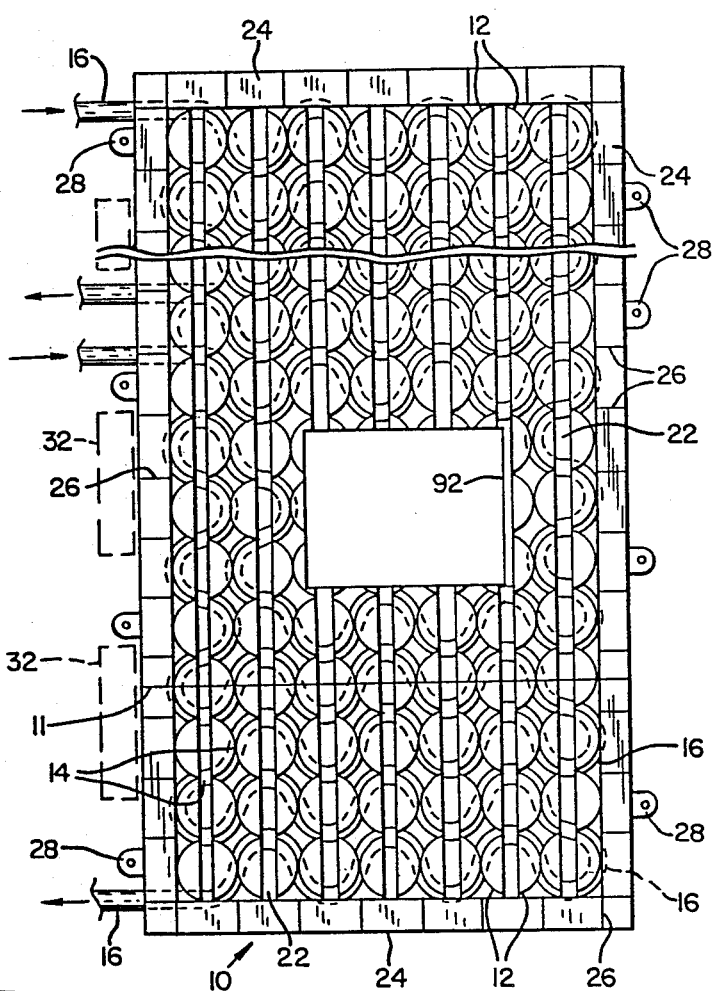
FIG. 5 is a foreshortened bottom plan view of one of the solar-energy-collecting panels used in the fabrication of the solar roof of FIGS. 1, 3 and 4.
Figure 6:
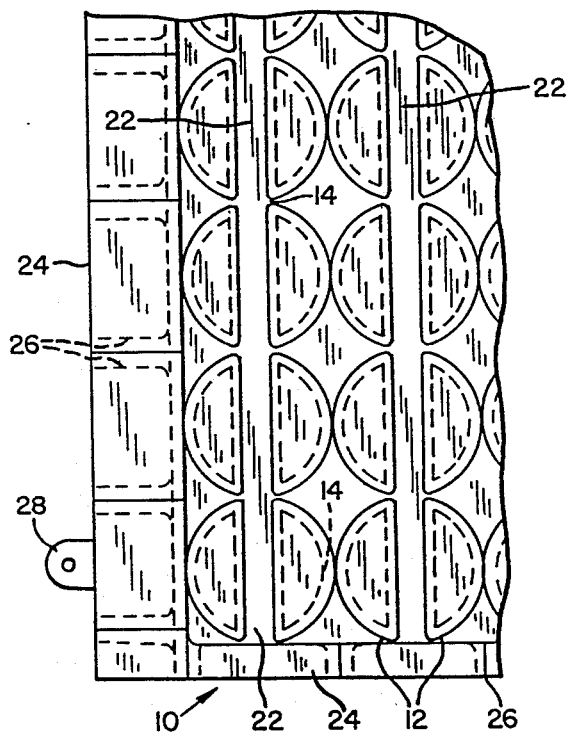
FIG. 6 is an enlarged fragmentary detailed bottom plan view similar to FIG. 5.

The solar-energy-collecting unit is indicated particularly at 10 in FIGS. 5 and 6. It comprises a flat pad of solar energy absorbent material. It may be fabricated from various plastic materials. Preferably it is comprised of molded black elastomeric materials, such as the various natural and synthetic rubbers, e.g. the extruded synthetic rubber made from ethylene-propylene-diene monomer and sold commercially under the brand name of "EPDM".

The molded product may have any predetermined and desired contour and dimensions. For the purposes of the present invention it may be produced in the form of rectangular panels which are thin enough to be relatively light in weight and flexible. Preferably, such panels after fabrication are vulcanized end to end to form a long, continuous strip which may be rolled up for storage and transportation. At the construction site, it then may be easily cut up into lengths and shapes having the desired configuration to suit a given roof design.

The top of each panel is substantially flat, but preferably has a roughened surface to increase its solar energy absorption qualities. It also may be provided with a molded-in design of any desired configuration.

The panels may be spliced together along their end boundaries, or cut and spliced centrally along a splice line indicated at line 11 of FIG. 5.

The underside of each panel is provided with a plurality of molded-in projections serving as feet 12 which support the panel on a supporting surface, for example a roof sub-structure.

The feet may have any desired arrangement and configuration. Preferably they are round, or elliptical in configuration.

The projections or feet are spaced from each other by a distance predetermined to provide channels 14. The channels preferably are substantially round or oval in cross section and are dimensioned to receive a flexible conduit 16 in a press fit and variable pattern.

Conduit 16 may be wound around the feet 12 in the manner required to service the panel. It is provided, FIG. 5, with an inlet end and an outlet end for attachment to plumbing conveying a heat exchange fluid, as will appear hereinafter.

Feet 12 have hollow centers, preferably provided by molding a continuous channel 22 through their centers along the length of the panel. The hollow centers reduce the overall weight of the panel, which, as noted above, approximates the weight of ordinary roofing. They also provide additional pathways for the reception of conduit 16.

Viewed from the underside, the panel is provided with a squared-off margin 24 which has molded-in channels 26. These align with channels 14 between feet 12 and lend versatility to the panel in that conduit 16 can be entered into the panel or exited from it at any point along the panel margin.

Panel 10 is further provided with a plurality of integral hold-down tabs 28 by means of which it is affixed to the underlying support structure. The tabs desireably may be provided with central openings to accommodate affixing nails or screws.

In the event that a plurality of panels are employed, connecting means are provided for interconnecting the panels to each other.

Figure 4:
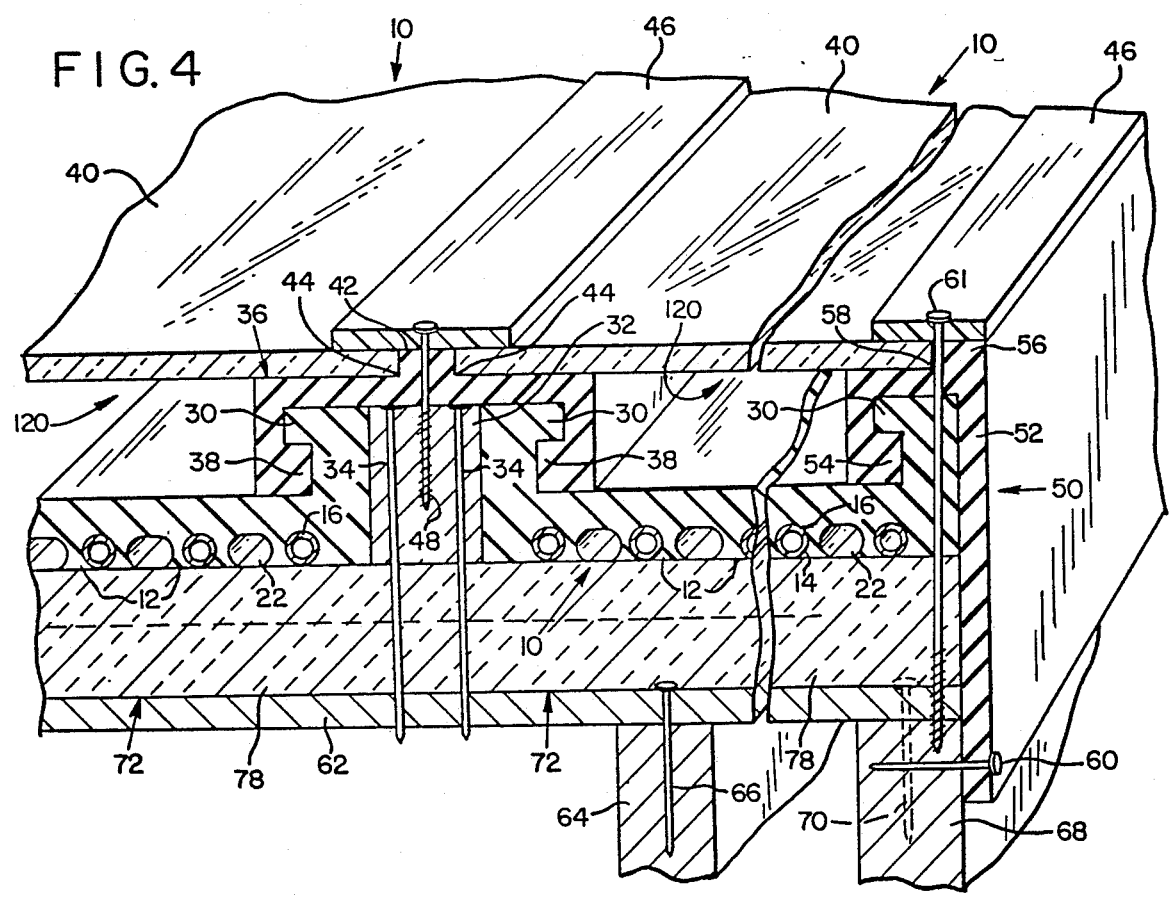
FIG. 4 is a fragmentary sectional view taken along line 4—4 of FIG. 1.

In the illustrated form of the invention, the connecting means comprise upstanding, inwardly directed flanges 30, FIG. 4, extending upwardly and inwardly from the opposite side edges of each panel.

Where a plurality of the panels are employed in side-byside spaced relation, they are maintained in the desired spaced relation by means of spacing blocks 32, FIG. 4. These are affixed to the roof substructure by means of nails or screws 34.

Spacing blocks 34 serve the ancillary function of positioning flanges 30 of adjacent panels 10 for the accurate reception of a combination connecting cap piece and seal strip indicated generally at 36, FIG. 4.

Each cap piece 36 is dimensioned to span the space between flanges 30 of adjacent panels 10. Its longitudinal side edges are provided with outwardly and inwardly directed flanges 38 which mate with flanges 30 of panels 10 in uniting the two panels through a sealed joint.

Like panels 10, cap pieces 36 may be fabricated from black elastomeric materials. They may be fabricated by molding or extrusion techniques.

Glazing support means are provided for positioning suitable glazing panels 40 in spaced relation above the upper surface of solar panels 10.

In the illustrated form of the invention, the glazing support means are combined with cap pieces 36 in the manner illustrated particularly in FIG. 4.

Each cap piece is provided with a central longitudinal ridge 42 extending centrally along its upper surface. The ridge forms a pair of shouldered recesses 44. Glazing panels 40 seat in these recesses, one glazing piece for each panel 10, spanning the space between flanges 30 of the latter.

Glazing pieces 40 are maintained in position and in sealed relation to the assembly by means of mounting strips 46 positioned and maintained in place by means of screws 48 penetrating the mounting strips, the cap pieces and spacing blocks 32.

The solar panel assembly is finished off at the sides of the building by means of side pieces indicated generally at 50, FIG. 4.

These elements of the assembly include a flanged base 52 designed to run alongside the side edge of terminal panel 10 and the adjacent supporting structure. It is provided with an inwardly-projecting, reversely-bent flange 54 which mates with flange 30 of the adjacent solar panel 10. It also is provided with an upwardly extending ridge 56 which defines a shouldered recess 58 for supporting glazing 40.

The side piece is secured to the assembly by means of nails 60 and screws 61.

Figure 1:
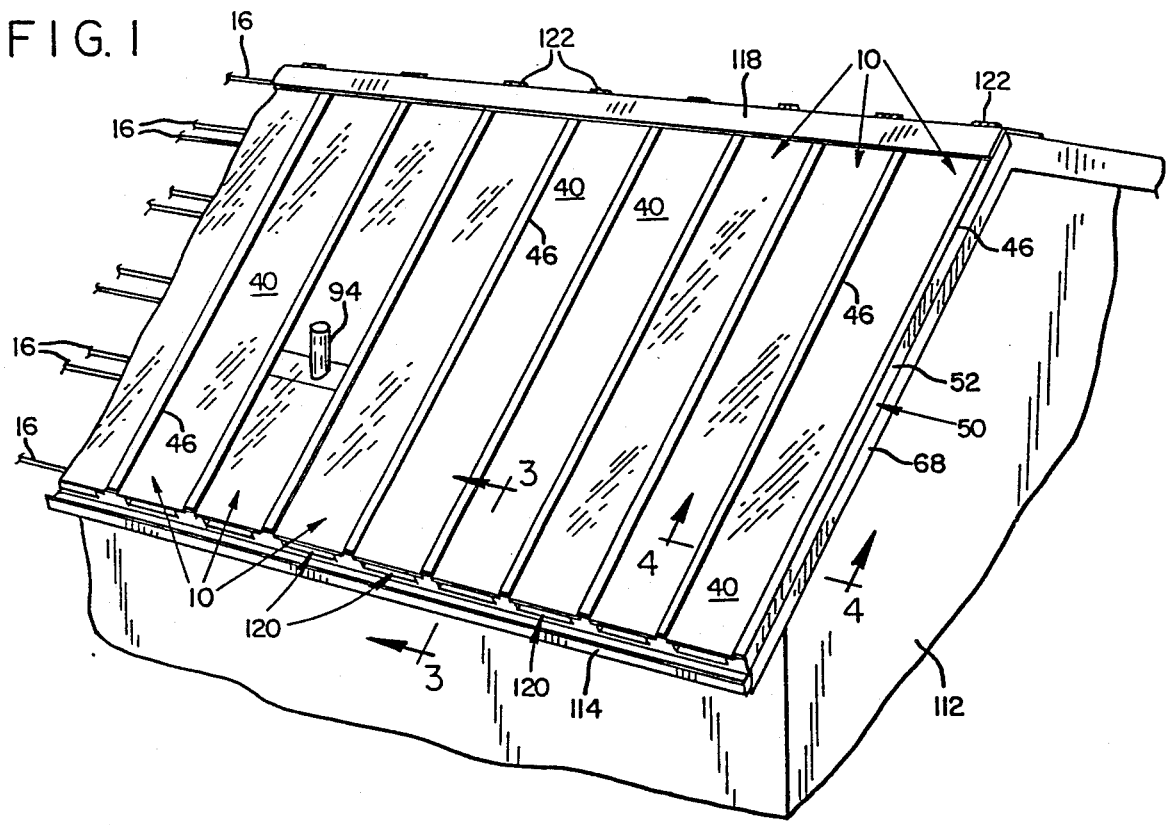
FIG. 1 is a fragmentary perspective view of a building incorporating the herein described solar roof.
Figure 3:
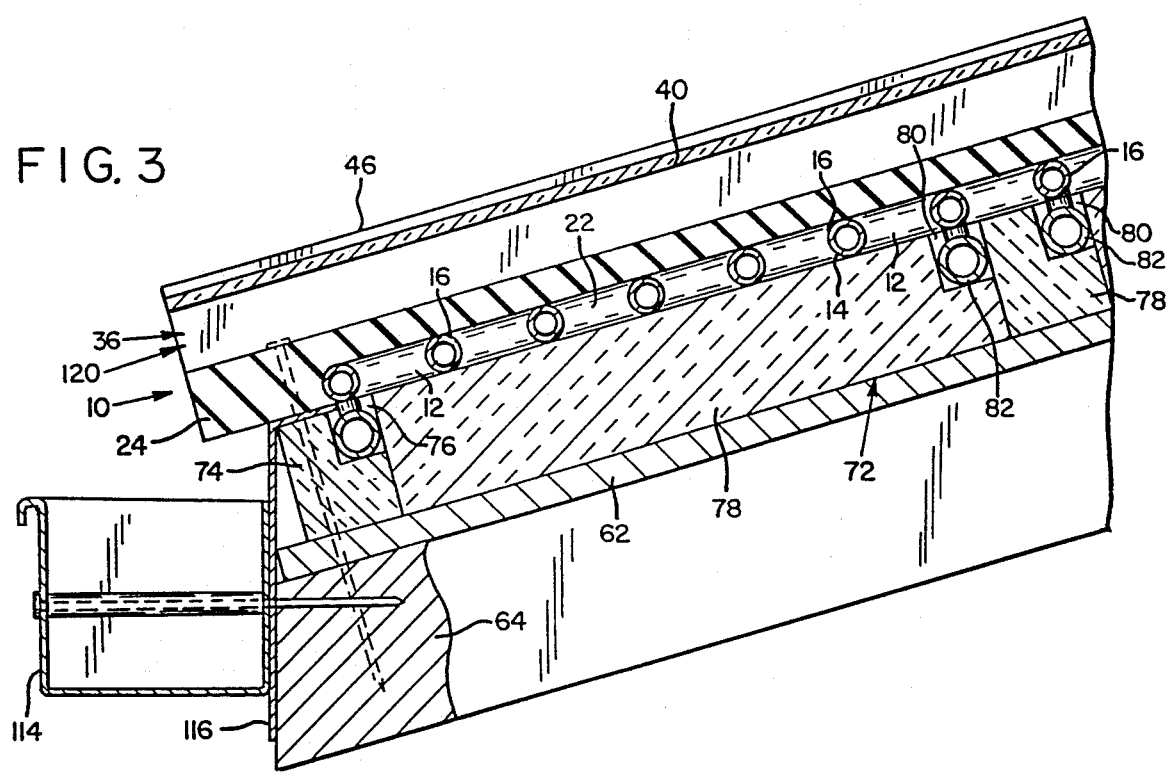
FIG. 3 is a fragmentary sectional view taken along line 3—3 of FIG. 1.

The solar panel assembly above described is applied to a supporting substructure which, as indicated, may comprise the substantially conventional substructure of a building roof. The manner in which this is accomplished is illustrated in FIGS. 1, 3 and 4.

Roof sheathing 62 is applied to rafters 64 in the usual manner, using nails 66.

A fascia board 68 also is applied by means of nails 70.

Insulation, such as conventional aluminum-covered, foamed styrofoam or other insulation in sheet form, illustrated at 72, is overlaid on the sheathing in conventional manner. The above described solar panels then are overlaid on the insulation.

This arrangement makes possible efficient installation of the plumbing which necessarily must be associated with the panel in order to supply it with water or other heat exchange fluid. The manner in which this is accomplished is illustrated particularly in FIG. 3.

Insulation 72 is applied in segments. Segment 74, which runs parallel to the eaves, is formed with a marginal cut-away portion forming a marginal ductway 76. Centrally installed pieces of insulation 78 are formed with marginal recesses forming marginal ductways 80.

Figure 7:
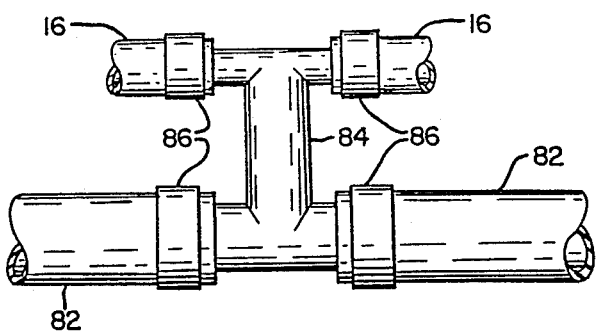
FIG. 7 is a fragmentary view in elevation taken along line 7—7 of FIG. 2 of a plumbing detail of the circulatory system of that figure.

The recesses conveniently accommodate ducts 82, which may comprise either supply lines or return lines for the fluid heat exchange medium. The couplings 84 for interconnecting the two are illustrated in FIG. 7. They comprise double "T's" to which the lengths of conduit 16 and ducts 82 are connected by means of clamps 86.

In the finished installation, the couplings may be positioned to advantage in the spaces between the ends of spacer blocks 32, FIG. 5.

Figure 2:
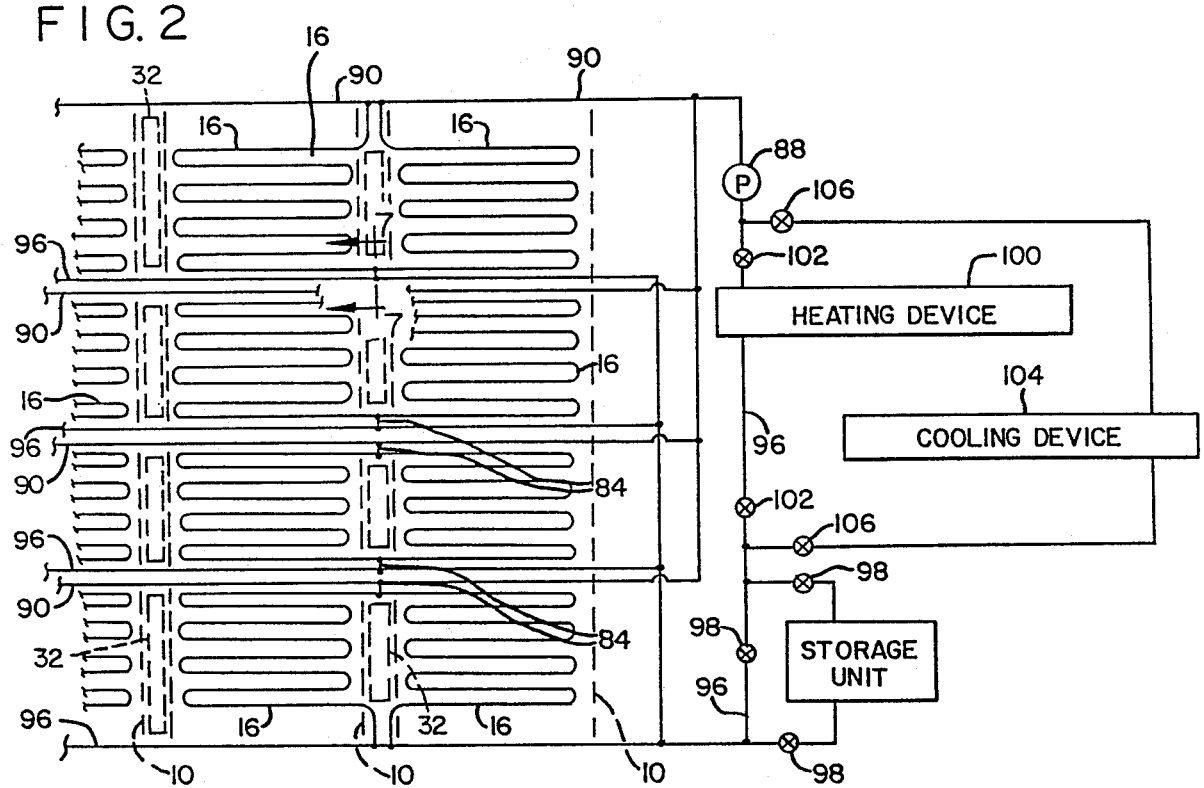
FIG. 2 is a schematic view of the circulatory system by means of which a heat exchange medium is circulated through the roof.

The plumbing by means of which water or other heat exchange fluid is circulated through the system is illustrated in FIG. 2.

Pump 88 pumps the fluid through supply conduits 90 which supply the fluid to conduits 16 arranged in the desired patterns illustrated, for example, in FIG. 5. In establishing the desired pattern, conduits 16 are arranged in the channels 14 between feet 12, as well as in the channels 22 within feet 14 and channels 26 in border 24. The arrangement thus will accommodate a roof opening indicated generally at 92, present to accommodate a soil pipe 94, FIG. 1, a chimney, or other obstruction present on the roof.

Within each panel, the heat exchange medium circulates through the heat-absorbing matrix, and becomes heated to an elevated temperature.

The hot heat exchange medium exits the panel at the bottom of each segment thereof and is coupled through a coupling 84 to return conduit 96, FIG. 2.

The return conduit conveys the heated medium to a storage unit (optional) controlled by valves 98. It conveys it further to a hot water heater, swimming pool, or other heating device 100, controlled by valves 102.

For summer use, the circuit may be used to cool the roof by pumping the heat exchange medium through the panels after cooling it with a cooling device 104, controlled by valves 106.

The general aspect of the applied installation is indicated in FIG. 1.

A conventional building 112 has applied to its roof, or to selected areas of its roof (for example those facing south) a plurality of adjacent solar energy collecting units 10 extending from eaves 114 with associated flashing 116 continuously upwardly to roof cap piece 118. Where glazing is used, the glazing 40 maintained by mounting strips 46 is all that appears to view. In the event that glazing is omitted, the black surface of solar panels 10 would be presented to view.

It is inherent in this construction (see also FIG. 4) that above each solar panel 10 there may be present an open channel 120 running from bottom to top of the panel. When solar heating is present, a chimney effect will result. This is arrested during the solar heating operation by the presence of a roof cap piece 118 of suitable construction, which may be hinged as at 122 (schematic). However, in the summer when a cooling effect is desired, hinging open the cap piece will remove the closure and activate the chimney effect, thereby promoting self-cooling of the roof.

Having thus described in detail a preferred embodiment of the present invention, it will be apparent to those skilled in the art that various physical changes could be made in the device described herein without altering the inventive concepts and principles embodied. The present embodiment is therefore to be considered in all respects as illustrative and not restrictive, the scope of the invention being indicated by the appended claims rather than by the foregoing description. All changes which come within the meaning and range of equivalency of the claims are therefore to be embraced therein.

I claim:

1. A solar roof comprising:

a support surface, a plurality of solar-energy-collecting units positioned on the supporting surface in spaced relation to each other, each collecting unit comprising a panel of solar-energy-absorbing material adapted to lie on the underlying supporting surface, the panel having on its undersurface a plurality of downwardly extending projections serving as feet which support the panel on the underlying supporting surface, the projections being spaced from each other by an amount predetermined to provide channels therebetween dimensioned to receive and support conduit means for transporting fluid heat exchange medium in heat exchange relation to the panel, and an elongated flexible conduit supported removably in said channels under the panel in a selected pattern and having fluid heat exchange medium inlet and outlet ends, securing means for securing the units to the supporting surface, a cap piece overlying the space between each adjacent pair of collecting units, and fastening means for releasably coupling the cap piece to the adjacent pair of collecting units, the fastening means comprising interlocking flange means on the cap piece and the panels of the collecting units.

2. The solar roof of claim 1 wherein the cap piece is flexible and the flange means on both the cap piece and the panels of the collecting units comprise reversely bent integral sections thereof.

3. A solar roof comprising:

a support surface, a plurality of solar-energy-collecting units positioned on the supporting surface in spaced relation to each other, each collecting unit comprising a panel of solar-energy-absorbing material adapted to lie on the underlying supporting surface, the panel having on its undersurface a plurality of downwardly extending projections serving as feet which support the panel on the underlying supporting surface, the projections being spaced from each other by an amount predetermined to provide channels therebetween dimensioned to receive and support conduit means for transporting fluid heat exchange medium in heat exchange relation to the panel, and an elongated flexible conduit supported removably in said channels under the panel in a selected pattern and having fluid heat exchange medium inlet and outlet ends, securing means for securing the units to the supporting surface, a cap piece overlying the space between each adjacent pair of collecting units, fastening means for releasably coupling the cap piece to the adjacent pair of collecting units, the fastening means comprising interlocking flange means on the cap piece and the panels of the collecting units and glazing support means on the cap pieces for supporting glazing above the panels in spaced relation thereto.

4. The solar roof of claim 3 wherein the glazing support means comprises shouldered recesses in the upper surfaces of the cap pieces.

* * * * *